Aug. 29, 1950     W. J. HUGHES     2,520,546
COUNTER FOR CHEMICAL FEEDERS
Filed Feb. 23, 1946
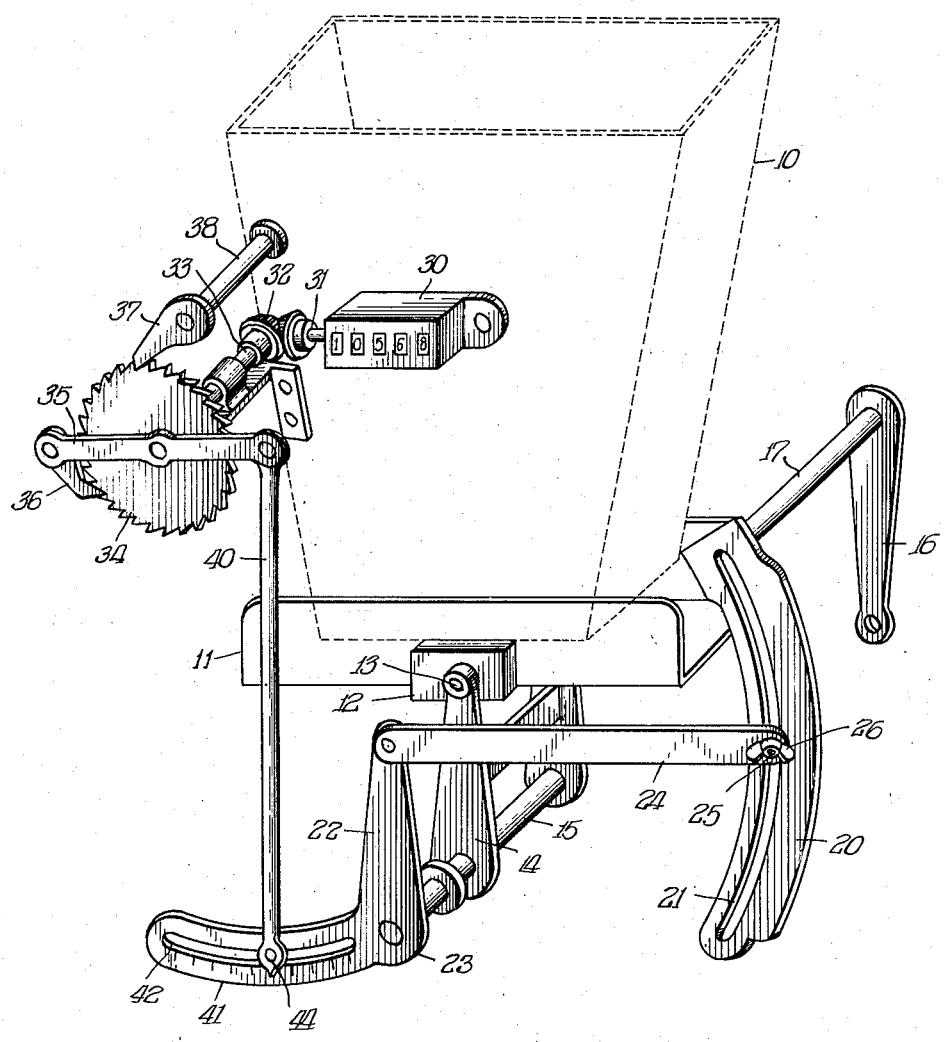
INVENTOR.
Walter J. Hughes,
BY Patented Aug. 29, 1950

2,520,546

UNITED STATES PATENT OFFICE 2,520,546

COUNTER FOR CHEMICAL FEEDERS

Walter J. Hughes, Chicago, Ill., assignor to Infilco Incorporated, Chicago, Ill., a corporation of Delaware Application February 23, 1946, Serial No. 649,560

11 Claims. (Cl. 222—31)

This invention relates to volumetric dry chemical feeders. More particularly it relates to means for integrating and indicating the quantity of dry material fed by a feeder, preferably by weight.

In any plant where chemicals are fed, such as for instance in water or sewage treating plants, it is desirable to know the exact quantity of chemicals used in any given period, for example, the number of pounds per day or hour. A primary use of such information is to provide a ready check on whether the proper amounts of chemicals are being used, although it is also important for proper cost accounting, and other purposes.

When feeding at a constant rate, it is relatively simple to note the number of hours a feeder has operated during a period of time, and to compute therefrom the quantity of chemicals fed. Nevertheless this method is of course subject to all the errors and irregularities of any personally taken record.

Constant rate feeding is, however, not the rule. There are many reasons why the rate of feed has to be changed frequently. To mention only a few: the quantity of a liquid being dosed, such as water or sewage, may vary, necessitating a change in the rate of dosage with chemicals in order to give adequate treatment; or the rate of flow of the liquid to be dosed may vary either at substantially regular intervals (as the hourly variations of a water treating or sewage plant, which follow a rather definite pattern), or irregularly, such as storm flows, etc. Since it is usual to keep the rate of chemical feed proportional to the rate of flow, the feed rate usually will vary in practice. Under such circumstances the mere recording and computing of the number of hours a feeder has operated does not afford knowledge of the quantity of chemicals actually fed. In this case, therefore, a great many different records and integrations become necessary and the number of errors and irregularities in making these will increase correspondingly.

It is obvious that this manner of acquiring data places a heavy burden on the operator and is at the same time a source of errors and inexactness. It is an object of this invention to eliminate this burden, and at the same time any possibility of errors by providing means for automatically integrating and indicating the quantity of chemicals fed by a feeder.

Another object of the invention is to provide a counting device which is driven from the drive mechanism of the feeder and which will indicate at any moment the quantity of chemicals, preferably by weight, that has been fed up to that moment.

Another object of the invention is to provide an indicating device for a chemical feeder which can be adjusted to correspond to the weight of any chemical to be fed, and which is automatically adjusted to varying rates of feed.

Other objects of the invention will become apparent from consideration of the description and the claims to follow.

My invention is suitable for use with any feeder having a substantially linear relation between the amplitude of reciprocation of the moving parts and the feed rate. Therefore, while it will be described for purposes of illustration and exemplification with a feeder of the type shown in my copending application, Serial No. 599,734, it will be understood that the invention is not limited to the specific embodiment shown and described hereafter.

The sole figure of the drawing shows an isometric view of a preferred embodiment of the invention.

The feeder whose output of chemicals is to be metered by my invention is shown for exemplification substantially in the form described in the above mentioned application. It may comprise a hopper 10 for the material to be fed, and a movable feeding receptacle or tray 11 from which the material may be extruded by any suitable means not shown. The feeding receptacle may be mounted below the hopper on a pan saddle 12 which in turn will be pivotally supported by any suitable means, such as trunnions 13, mounted in one end of supporting links 14, the other end of which may be rigidly mounted on a shaft 15. Reciprocation of the shaft is derived through the intermediary of a main crank 16 which may be connected through suitable linkage, not shown, to any source of power. The main crank 16 is rigidly mounted on a crank shaft 17, on which is also rigidly mounted a curved rate setter crank 20 preferably having a peripheral slot 21. A crank 22 which may be one arm of a rocker 23 is keyed to shaft 15 as shown. The free end of the crank 22 is pinned to a link 24, which is also adjustably pinned to the curved crank 20. If the curved crank is slotted as preferred, the right end of link 24 will carry a pin 25 fitting in the slot 21 and locked at any position along the slot by any suitable means, such as wing nut 26.

With this construction it is obvious that the setting of the pin 25 in the slot 21 will define the amplitude of reciprocation of the feed receptacle 11, and therefore the rate at which chemicals are fed by the feeder. With the pin set at its uppermost position, motion of the crank 22 and the shaft 15 will be at a minimum, and the receptacle 11 will therefore have a minimum movement and a minimum of chemicals will be fed. On the other hand, when the pin 25 is set at the lowermost end of the slot 21 the amplitude of reciprocation will be at its maximum, and the feeder will operate at its maximum rate. The structure described so far has been disclosed in the said copending application and is not claimed herein except in conjunction with the present invention, which resides in the device, connected to and driven by the feeder, for integrating and indicating, preferably by weight, the quantity of chemicals fed by the feeder.

To meter, or integrate, the quantities of chemicals fed from the reciprocating receptacle 11 I utilize a counter of known construction, indicated at 30. Such devices are old per se, being available in the open market in various forms, but as far as is known to me it has never heretofore been suggested to use such a counter in a combination and manner, or for the purpose I now propose.

In order that the counter indicate the actual quantity of material dispensed by the feeder, it has to be driven at a speed proportional to the predetermined angular amplitude of reciprocation of the receptacle 11. Since it is usually desirable to meter the quantity of chemicals by weight, the proportion between the speed of the counterdrive and the reciprocal amplitude of the receptacle will be defined by the specific weight of the material to be fed.

To proportion the speed of the counter to the feed rate, i. e. the amplitude of movement of the tray 11, I provide suitable linkage for transmitting the amplitude of the angular movement of the crank 22 to the drive shaft 31 of the counter 30 in such manner that the drive shaft 31 is rotated through an angle proportional to the amplitude of oscillation or reciprocation of the crank 22. A simple and preferred form of such connection is shown in the drawing. Briefly the drive shaft 31 is connected through suitable gearing 32 to a shaft 33 to which a ratchet wheel 34 is keyed. An arm 35 is pivotally mounted on the shaft 33 and carries a pawl 36 which registers with the teeth of ratchet wheel 34. Preferably, to provide against reverse rotation of the ratchet wheel 34, I provide a second pawl 37, also registering with the teeth of ratchet wheel 34. The second pawl 37 is mounted on a stationary arm 38, which is supported by any suitable means, such as on the wall of the hopper 10. A link 40 is pinned to the right or free end of the arm 35 and is adjustably pinned to the other arm 41 of rocker 23, as described below.

With this construction it will be obvious that oscillation of the crank 22 will oscillate the arm 35 and pawl 36 to progressively turn the ratchet wheel 34, and the shaft 33 keyed thereto, anticlockwise. Each progressive movement of the ratchet wheel 34 and shaft 33 is through an angle which is proportional, at any given setting of the link 40 on the arm 41, to the amplitude of oscillation of the crank 22. Since the amplitude of oscillation of the crank 22 governs the amplitude of reciprocation of the feed receptacle 11, it will be obvious that the rotational speed of the shaft 33 (and therefore also of the drive shaft 31 of the counter geared to it) will thus be proportional to the feed rate. Thus any variation in the rate of feed (set by adjustment of location of the pin 25 in the slot 21) automatically varies the amount of rotation of shaft 32 with each stroke of the feeder.

Preferably adjusting means will be provided to vary the proportion of the amplitude of movements of the crank 22 and the ratchet wheel 34 over the range of specific weights of the various materials being fed, such as lime, soda, alum, etc. Even where only one kind of material is to be fed such adjustability is desirable, as the specific weight of such materials varies from batch to batch, so that for exact operation it is necessary to reset the adjusting means for the exact specific weight of each new batch. So far as I am aware no means has heretofore been proposed for this purpose. In order for the counter to accurately integrate the weight of the various materials delivered by the feeder, the relative amplitude of the reciprocating movement of the crank 22 and the angular movement of the ratchet wheel 34 must be subject to adjustment, as such relative movement has a definite value for each specific weight of any material to be fed. I provide, therefore, means for setting this relation at different values in accordance with various specific weights by varying the length of the stroke of the link 40 in relation to the movement of the crank 22. This adjustment is secured by moving the pin 44 by which the link 40 is connected to the arm 41, along that arm. Preferably the weight setter arm 41 is provided with an arcuate slot 42 curved to form the segment of a circle, of which the rod 40 is the radius. The pin 44 is movable along the slot 42, and may be set in any desired position along the slot by suitable means such as a lock nut, not shown. With this construction it will be seen that the proportional relation between the two movements (that of rod 40 and that of crank 22) is governed by the setting of the pin 44 in slot 42. When the pin is set at the right end of the slot 42, nearest the crank 22, the proportion of the amplitude of movement of the crank 22 that is transmitted to the link 40 will be at its minimum value; and conversely, when the pin 44 is set at the opposite end of the slot 42, it will be at its maximum value. Consequently the speed at which the counter is driven increases directly with the distance the pin is set away from the crank 22.

It will be obvious that the rate at which the counter is driven is governed by two factors: the setting of pin 25 in slot 21 of rate setter 20, which defines the amplitude of movement of crank 22 and feeding receptacle 11; and the setting of pin 44 in slot 42 of the weight setter 41, which governs the relative amplitudes of the oscillation of crank 22 and the angular movement of ratchet wheel 34. For each setting of pin 25 there is a definite amplitude of movement of crank 22. For each setting of pin 44 there is a definite proportion of this amplitude transmitted to the drive shaft 31 of the counter. Thus the rate setter 20 is used to vary the volume of material delivered by each stroke of the feeder pan 11. The weight setter arm 41 is used to vary the relative amplitude of the reciprocation of pan 11 and of the rotation of counter drive shaft 31 proportionately to the specific weights of the materials being fed. Thus when a heavy material is being fed the pin 44 will be set toward the left, or free, end of the arm 41. Conversely, when a light material is being fed the pin 44 will be set toward the right, or inner, end of the arm 41. In practice, knowing, for instance, the rate of feed of alum to be 180 lbs. per hour when rate setter pin 25 is set at its maximum (lower) position in slot 21 of rate setter 20, the pin 44 is set in slot 42 of the weight setter 41 so that the counter will run up a count of 180 in one hour. Then, if the rate setter pin 25 is set for 50% or 90 lbs. per hour, the amplitude of crank 22 will be half as much as at the maximum position of pin 25. Since the setting of pin 44 in slot 42 has remained unchanged, the same proportion of the new amplitude of movement of crank 22 will be transmitted to the counter drive shaft 31 as before. The counter will therefore be driven at half the rate and run up a count of 90 in one hour. When another material is fed, the location of weight setter pin 44 in slot 42 is changed to vary the proportion of movement of crank 22 that will be transmitted to shaft 31 proportionately to the specific weight of that material. Proper points of setting of pin 44 along slot 42 for various weights of material can be easily determined. The weight setter arm 41 may be properly calibrated and a pointer affixed to the link 40 to facilitate setting of the pin 44. With proper setting of the pin 44 for the exact specific weight of each material being fed the counter will indicate at any moment the exact weight of the material that has been delivered by the feeder.

It will be seen that I provide a new and practical means for automatically integrating the weight of the material fed by a feeder of the type described, and for easily and exactly setting the counting means for the specific weight of any material to be fed. It will be obvious to those skilled in the art that the invention is not limited to the exact construction shown and described for purposes of illustration, but that the embodiment shown could be changed in various respects without departing from the spirit and scope of the invention. What matters is that the amplitude of rotation of the counter drive shaft is variable in direct proportion to the specific weights of materials to be fed, and for any predetermined setting of the weight setter is automatically in direct proportion to the amplitude of reciprocation of the feeder (which, in turn, is directly proportional to the feed rate set by the rate setting means). Obviously, these essential features of the invention could be embodied in a different construction than that shown and described. It will be understood, therefore, that I do not wish to limit myself thereto, but that the claims which follow are to be given as broad an interpretation as may be permitted by prior art.

I claim:

1. In combination with a feeder having reciprocating means swingable about a center of rotation for operating said feeder, and rate setting means connected to said reciprocating means for governing the amplitude of reciprocation of said reciprocating means, counting means adapted to integrate the quantity of material fed at any setting of said rate setting means, said counting means comprising a counter, rotatable drive means connected to said counter, and a reciprocable member operatively connecting said counter drive means to the reciprocating means of said feeder so as to move said counter drive means through an angular amplitude directly proportional to the amplitude of reciprocation of said reciprocating means.

2. The apparatus of claim 1 comprising also adjusting means for radially positioning said reciprocable member with respect to the center of rotation of said reciprocating means, including an arm rigidly connected to said reciprocating means and swingable therewith, and means for positioning the reciprocable member along said arm so as to vary the ratio between the angular amplitude of said drive means and the amplitude of reciprocation of said reciprocating means.

3. In combination with a feeder having a reciprocable receptacle, reciprocating means having a variable amplitude of reciprocation for reciprocating said receptacle, and rate setting means governing the amplitude of reciprocation of said reciprocating means, a counter, a rotatable shaft geared to said counter, a ratchet wheel keyed to said shaft, a ratchet arm pivotally mounted on said shaft, a pawl mounted on one end of said ratchet arm and registering with said ratchet wheel, a sector rigidly connected to said reciprocating means, and a link pivotally connected to said ratchet arm with one end, and adjustably pinned to said sector with its other end.

4. In combination with a volumetric dry feeder including a reciprocating member, the quantity of material fed by said feeder being proportional to the amplitude of reciprocation of said member, and rate setting means governing the amplitude of reciprocation of said reciprocating member, a counter, drive means geared to said counter, and linkage connecting said drive means to said reciprocating member and adapted to move said drive means through an angle proportional to the amplitude of reciprocation of said reciprocating member, said linkage including a reciprocable rod pinned to said drive means, an arm rigidly connected to said reciprocating member, a curved slot in said arm, and means to position said rod in said slot.

5. In a volumetric dry chemical feeder having a reciprocating member and the feeding characteristic of delivery proportional to the set angular amplitude of said reciprocating member, the combination with said reciprocating member of a counter, a second member operatively connecting said counter to said reciprocating member so as to rotate said counter through an angular amplitude proportional to that of the reciprocating member, and means for adjusting said second member radially with respect to the center of reciprocation of said reciprocating member so as to vary the relation between the amplitude of rotation of said counter and the amplitude of reciprocation of said reciprocating member for adjustment in respect to the specific weight of the material being fed.

6. Counting means for a volumetric dry chemical feeder having a reciprocating member and the feed characteristic of delivery proportional to the set amplitude of reciprocation of said reciprocating member, said counting means comprising a counter, drive means for said counter including an oscillatory member, and connecting means connecting said oscillatory member to the reciprocating member of said feeder so as to oscillate said oscillatory member through an angle proportional to the set amplitude of reciprocation of said reciprocating member, said connecting means including a reciprocable rod, one end of said rod being pinned to said oscillatory means and the other end of said rod being connected to said reciprocating member, and means for varying the radial distance between the center of rotation of said reciprocating member and said other end of said rod so as to vary the ratio between the amplitude of oscillation of said oscillatory member and the amplitude of reciprocation of said reciprocating member.

7. In combination with a volumetric dry feeder having a reciprocating feed receptacle, reciprocating means for said receptacle, and rate setting means governing the amplitude of reciprocation of said reciprocating means and feed receptacle, integrating means adapted to measure by weight the quantity of material fed from said feed receptacle comprising a rotatable member, oscillatory means operative to rotate said rotatable member, and linkage connecting said oscillatory means to said rate setting means so as to move said oscillatory means through an angle which is proportional to, and variable in amplitude with respect to, the amplitude of reciprocation of said feed receptacle, said linkage including a weight setting sector rigidly connected to said reciprocating means, a rod pivotally connected to said oscillatory means and to said weight setting sector, and adjusting means for positioning said rod along said weight setting sector so as to vary the proportion of the movement of the said reciprocating means transmitted to said oscillatory means through said linkage in accordance with variations in specific weight of the material fed from said receptacle, and a counter driven from said rotatable member.

8. In combination with a feeder having a reciprocable receptacle, reciprocating means adapted to reciprocate said receptacle, and rate setting means governing the amplitude of reciprocation of said reciprocating means, a counter, a rotatable shaft geared to said counter, a ratchet wheel affixed to said shaft, an arm pivotally mounted on said shaft, a pawl on one end of said arm, a link pinned to the other end of said arm, a second arm having a slot curved to form the segment of a circle having a radius equal to the length of said link, the free end of said link being movable along said slot, means for positioning said link on said slot, one end of said second arm being rigidly connected to said reciprocating means.

9. In combination with a chemical feeder having a driving crank and a rate of feed linear to the angular movement of said driving crank, and a sector and crank driving link positionable along said sector governing the amplitude of the angular movement of said crank, a second sector rigidly connected to and moved in unison with the said driving crank, a counter and a counter driving link in driving connection with said counter and adjustably connected to said second sector, so as to rotate the said counter through an angle proportional to the amplitude of the angular movement of said crank, as set by the setting of said crank driving link on said first sector, and having a ratio to the amplitude of said angular movement varying with the setting of said counter driving link on said second sector.

10. In combination with a volumetric chemical feeder having a movable element, means for varying the amplitude of the movement of the movable element, and a feed characteristic of delivery proportional to the amplitude of said movement, a sector rigidly connected to said movable element so as to be moved in unison therewith, a counter, drive means geared to said counter, and a link operatively connecting said drive means and said sector, said link being adjustable along said sector.

11. In combination with a feeder having a reciprocating operating member swingable about a center of rotation, and rate setting means controlling the amplitude of reciprocation of said reciprocating member, a counter, drive means for the counter, and a link operatively connecting said drive means with said reciprocating member, said link being pivotally fixed at one end to said drive means and at the other end being pivotally connected to said reciprocable member so as to move said drive means through an angle proportional to the amplitude of reciprocation of said reciprocating member, said other end of said link being adjustable radially with respect to said center of rotation of said reciprocating member so as to vary the ratio of the amplitudes of movement of said drive means and of said reciprocating member.

WALTER J. HUGHES.

REFERENCES CITED

The following references are of record in the file of this patent:

UNITED STATES PATENTS

| Number | Name | Date |
| --- | --- | --- |
| 265,696 | Osborne | Oct. 10, 1882 |
| 714,958 | Sleeman et al. | Dec. 2, 1902 |
| 1,193,704 | Ludlow | Aug. 8, 1916 |
| 2,116,105 | Eaton | May 3, 1938 |
| 2,279,475 | Merrick | Apr. 14, 1942 |
| 2,334,337 | Lawry et al. | Nov. 16, 1943 |
| 2,389,702 | Ullmer | Nov. 27, 1945 |

Certificate of Correction

Patent No. 2,520,546 August 29, 1950

WALTER J. HUGHES

It is hereby certified that error appears in the printed specification of the above numbered patent requiring correction as follows:

Column 1, line 24, for the word "quantity" read *quality*;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*